(No Model.)

R. G. SNEATH.
APPARATUS FOR COOLING, AERATING, AND EVAPORATING FLUIDS.

No. 581,439. Patented Apr. 27, 1897.

Witnesses,

Inventor,
Richard G. Sneath
By Dewey & Co.
Attys

UNITED STATES PATENT OFFICE.

RICHARD G. SNEATH, OF SAN FRANCISCO, CALIFORNIA.

APPARATUS FOR COOLING, AERATING, AND EVAPORATING FLUIDS.

SPECIFICATION forming part of Letters Patent No. 581,439, dated April 27, 1897.

Application filed December 8, 1896. Serial No. 614,927. (No model.)

*To all whom it may concern:*

Be it known that I, RICHARD G. SNEATH, a citizen of the United States, residing in the city and county of San Francisco, State of California, have invented an Improvement in Apparatus for Cooling, Aerating, and Evaporating Fluids; and I hereby declare the following to be a full, clear, and exact description of the same.

This invention relates to an apparatus which is especially designed to cool, aerate, and evaporate fluids of various descriptions.

It consists of the parts and the construction and combination of parts herein described and claimed.

It also consists in details of construction, which will be more fully explained by reference to the accompanying drawings, in which—

Figure 1:
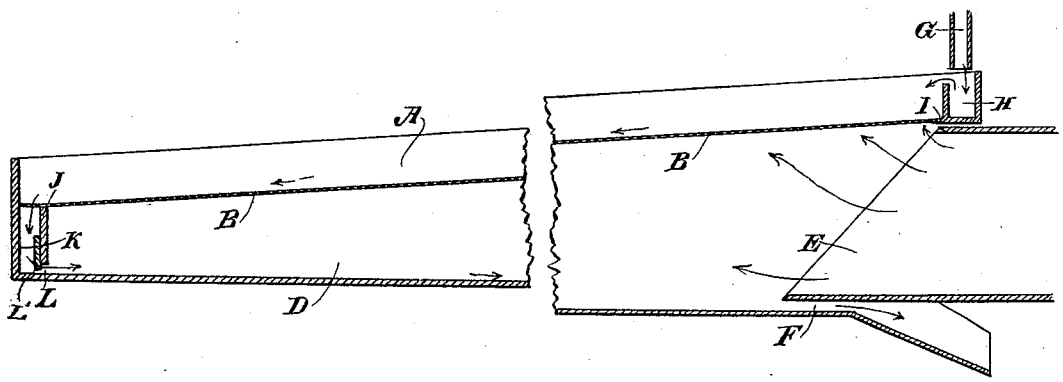
Figure 2:
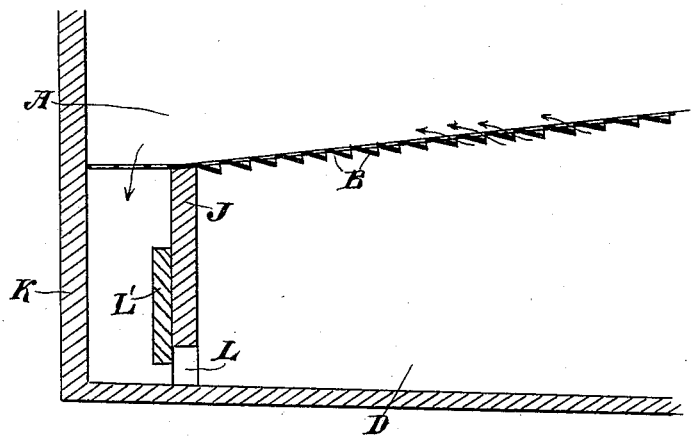
Figure 3:
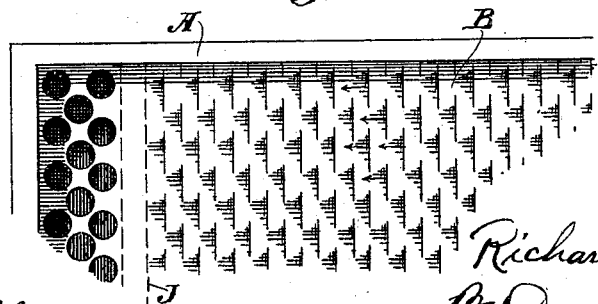

Figure 1 is a longitudinal vertical section of an apparatus illustrating my invention. Fig. 2 is a similar view of the apparatus when used with milk. Fig. 3 is a plan view of the same.

The object of this invention is to cool, aerate, or evaporate fluids—such as water, milk, cream, salt brine, saccharine water, or any other liquid which it is desirable to have thus operated upon.

In the present case I have shown a sluice A, of any suitable dimensions suited to the quantity of liquid to be treated and made of such material as will best serve the purpose. If milk, cream, or similar substances are to be treated, it is necessary to make the sluice of tin or other material which may be readily cleansed at frequent intervals. If simply used for the cooling of water or other liquids, care in this particular will not be so necessary.

The sluice A may be of any desired width. It has a bottom B, which is perforated or formed with slits or small openings. Beneath this sluice is a closed chamber D, extending the entire length and having at one end connection with a pipe E, through which a blast of air is delivered into the chamber from any suitable air-forcing mechanism. At the bottom of the chamber and at the same end is an outlet-opening F, through which the cooled liquid may pass.

G is a pipe or passage through which the liquid is supplied to the trough or sluice A.

If the apparatus is to be used for cooling water in large quantities, as in case of water to be used for condensing purposes or for the cooling of water the temperature of which has been raised in the operation of ice-machines, the sluice may be upward of four or five feet in width and upward of forty feet in length. The bottom is perforated with small holes. At the receiving end of the sluice a box H extends across the full width, and an apron I extends from the bottom of this box a short distance along the floor of the sluice, this apron being closed to prevent the liquid falling into the chamber beneath. After it has flowed beyond the edge of the apron and into the sphere of the air-pressure from below the air will be constantly forced up through the holes, filling the liquid with air and preventing it from passing down through the holes. The receiving-head box H has an overflow which discharges the water at an even depth over the whole width of the sluice.

The water flowing down the sluice is prevented from passing through the openings or perforations in the floor B by the pressure of the air in the chamber below, the air being constantly forced up through all of the openings, thus keeping the water in a state of violent ebullition and forcing the air through every part of it with continually fresh supplies of cool air, so that by the time the water has reached the lower end of the box it will be thoroughly cooled. If the liquid is to be heated or evaporated, a hot-air blast may be substituted for the cold air.

At the discharge end the floor B extends a short distance beyond the end J, covering a vertical passage which is made between the end wall J and an exterior wall K, which latter may be situated about an inch and a half away from the wall J. Between these two is a vertical passage, through which the water passes, and at the bottom of this passage is an opening at L, through which the water is delivered into the bottom of the air-chamber D, so as to flow along the bottom and be again exposed to the action of the air, which is being continually forced into this chamber. When it reaches the passage F, it flows out and is delivered into a tank or wherever it is next required.

The portion of the bottom B which passes over the vertical passage between K and J has openings of sufficient diameter made in it to allow the whole body of water which flows through the sluice A to pass through these openings, and the discharge at L may be regulated by a gate L' or otherwise, so that the vertical passage will be kept full of water all the time, thus acting as a seal to prevent any escape of air at this point.

If instead of cooling the water it is desired to evaporate it, the blast of air may be heated to any desired degree, and being forced up through the water flowing in the sluice will continually agitate and evaporate it as it passes.

When used for milk, the apparatus is made much smaller and of a size depending upon the amount of milk to be treated. It is especially valuable for this purpose, because it is desirable to have milk cooled and aerated as rapidly as possible after it has been drawn from the animal, as this greatly increases its preservative quality and also clears it of the animal odors. In this case, however, it is undesirable to have the jets of air forced directly up through the milk in a vertical direction, because it acts to churn it and tends to convert it into butter. When, therefore, it is used for this operation, I prefer to make transverse slits in the floor B of the sluice, the openings being slightly inclined, so that the air in passing through the milk will pass through it diagonally, and this prevents the churning action which would otherwise take place.

Having thus described my invention, what I claim as new, and desire to secure by Letters Patent, is—

1. An apparatus for cooling, aerating and evaporating fluids, consisting of a sluice having a foraminous bottom, a closed chamber beneath the sluice, a passage through which air is supplied to said chamber under pressure whereby the liquid flowing in the sluice is constantly acted upon by jets of air passing through the perforated bottom, said chamber having a trap or seal at one end, to prevent the escape of air, and having a discharge-passage at the bottom of the air-receiving end through which the liquid is delivered.

2. An apparatus for cooling, aerating and evaporating liquids, consisting of a sluice having a supply-pipe and distributing-box at the head, a perforated bottom over which the liquid flows, a closed chamber situated beneath the bottom, a passage through which air is admitted to said chamber under pressure, a vertical passage at the opposite end of the sluice and connecting said sluice with the chamber to deliver the liquid thereinto and form a trap to prevent the escape of air, and a discharge-passage at the bottom of the air-receiving end of the chamber through which the liquid is delivered.

In witness whereof I have hereunto set my hand.

RICHARD G. SNEATH.

Witnesses:
S. H. NOURSE,
J. C. BRODIE.